J. Absterdam,
Manf. Steel Headed Rails.

No. 98,537. Patented Jan. 4, 1870.

Witnesses.
E. F. Kastenhuber
C. Wahlers

Inventor.
John Absterdam
Van Santvoord & Hauff
Attys

UNITED STATES PATENT OFFICE.

JOHN ABSTERDAM, OF NEW YORK, N. Y.

Letters Patent No. 98,537, dated January 4, 1870.

IMPROVED METHOD OF MANUFACTURING A FAGOT FOR STEEL-HEADED RAILS.

The Schedule referred to in these Letters Patent and making part of the same.

*To all whom it may concern:*

Be it known that I, JOHN ABSTERDAM, of the city, county, and State of New York, have invented a new and useful Improvement in the Manufacture of Steel-Headed Railroad-Rails; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

My invention consists in a method or process for forming steel-headed rails, as will be hereinafter more fully described.

In the ordinary process of making steel-headed rails, the steel and iron bars are welded together by the action of the hammer, or by means of rollers. By this process, the steel cannot be made to adhere to the iron with the requisite tenacity, for the following reasons: In the ordinary process of welding wrought-iron bars together, the iron is heated to what is termed the "welding"-heat, which actually means a "melting"-heat, for the term welding, in this case, means nothing else but melting the surfaces together, and consolidate or interlock them, either by the blows of the hammer, or by the elongating pressure of rollers. But, in welding cast-steel, the steel, not being able to sustain a welding or melting-heat without losing its quality, can only be heated to a bright yellow heat, and must be welded, or made to adhere together, by means of its plastic nature, or its adhesive properties, instead of melting the surfaces together, as is done in welding wrought-iron; and, if very low steel is used, and the surfaces of the steel to be welded are small, the hammers or rollers are sufficient to accomplish the welding. But, when the steel is high, and the surfaces to be welded are large, the welding becomes very difficult by hammering, and still more so by rolling, on account of the displacement of the surfaces which are to be joined together, the blows of the hammer scattering the surfaces in every direction, and the rollers causing the surfaces to slide over each other, and thereby preventing their consolidation, so that, in a steel-headed rail in which the steel is welded to the iron by the action of rollers or hammers, the steel is liable to crumble, and to scale off, rendering the said rail useless.

Figure 3:
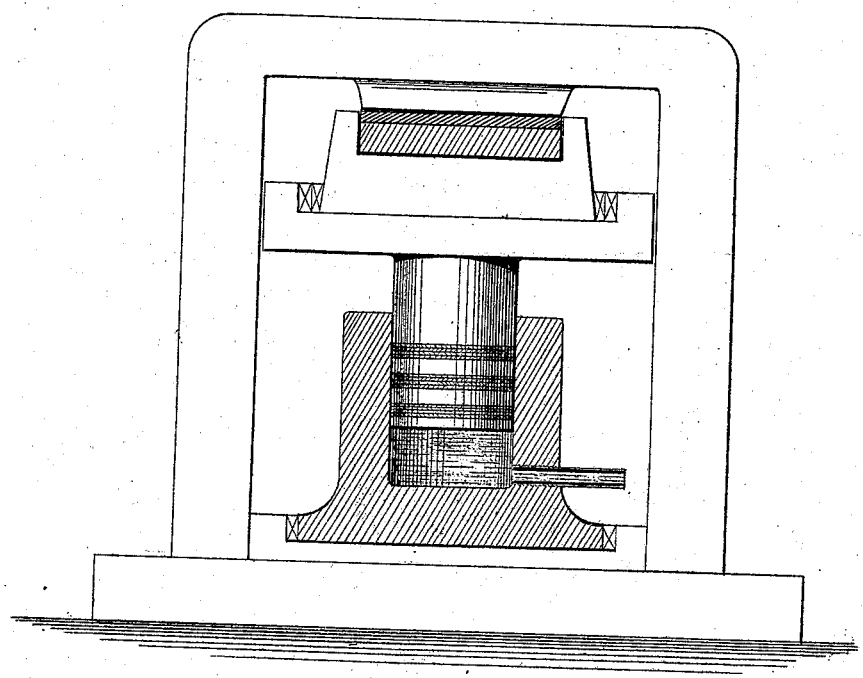
Figure 3 is a diagram of the press which I use in preparing my combination top bar.

This difficulty I have remedied by uniting the steel and iron used in the manufacture of a steel-headed rail by the action of a press, and a subsequent process, hereafter described. I commence by forging or rolling the steel and the iron into bars of the required shape, in the usual manner. I then take a bar of steel, and a thin bar of iron, presenting an equal surface to that of the steel, and heat them both—the steel bar to a bright yellow heat, and the iron bar to the ordinary welding-heat, and then place the two bars, one over the other, on the bed-plate of a press, and immediately subject the whole to a powerful pressure (according to the size of the bars to be welded) in a press, such as shown in the diagram, fig. 3, and the welding of the steel and iron is effected by pressing the fibre or grain of the two metals into each other, without displacing or forcing away the surfaces to be welded together, and a combination bar is obtained, one side of which is iron, and the other steel, the steel being united to the iron in a permanent manner, so that it is not liable to crumble to pieces, or to scale off, by the action of the roller, when the pile is rolled into a rail, as the iron side of the combination bar prevents the steel from crumbling, and the welding together of all the plates or bars composing the pile into one rail takes place in the same manner as if all the plates or bars were made of iron, as the welding is only iron to iron, with the exception that the steel side of the combination bar or plate must be, to some extent, protected from the too severe action of the flame, while the pile is being heated, for rolling into a rail.

This protection I obtain either by turning the pile, with steel side downward, against the bed or earth of the furnace, and having smeared the steel surface with a thin coating of a paint or paste made with fire-clay, or some other suitable refractory coating, previous to the introduction of the pile into the furnace.

Figure 1:
Figure 1 represents a transverse section of the combination top bar which I use in carrying out my invention.
Figure 2:
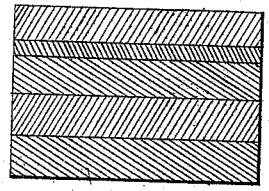
Figure 2 is a similar section of the pile from which I roll my steel-headed rails.

My combination bar is shown in fig. 1; and, in order to form a steel-headed rail, I place this combination bar on the top of a pile of iron bars, such as shown in fig. 2, the steel side of the combination bar being turned up, and then I heat this pile to a welding-heat, the steel being protected against being overheated, and, by passing the heated pile through suitable rollers, the steel-headed rail is formed, the steel head being firmly united to the iron body of the rail by the intermediate bar of iron, which is first united to the steel by the action of the press.

I do not claim broadly as my invention to produce a steel-headed rail from a pile, the top bar of which is composed of steel and iron previously united; but

What I claim as new, and desire to secure by Letters Patent, is—

The method, hereinbefore described, of preparing a fagot of iron and steel, and of heating the same ready to be passed through the rolls; that is to say, welding a plate or bar of iron and a plate or bar of steel together, by pressure, operating simultaneously over the whole extent of the surface to be welded, placing the compound bar thus formed on a pile or fagot of iron bars, covering the exposed surface of the steel with a coating of fire-clay, or equivalent substance, and heating the pile to a degree sufficient to be passed through the rolls, with the steel portion lying upon the sole of the furnace, all as described.

This specification signed by me, this 13th day of October, 1869.

JOHN ABSTERDAM.

Witnesses:
W. HAUFF,
E. F. KASTENHUBER.